(12) United States Patent
Chang (10) Patent No.: US 7,508,182 B1
(45) Date of Patent: Mar. 24, 2009

(54) METHOD AND APPARATUS FOR IMPROVED CURRENT MODE CONTROL FOR LARGE CONVERSION RATIO SYNCHRONOUS BUCK CONVERTER WITH LOSSLESS CURRENT SENSE

(75) Inventor: Chin Chang, Agoura Hills, CA (US)

(73) Assignee: Semtech Corporation, Camarillo, CA (US)

( * ) Notice: Subject to any disclaimer, the term of this patent is extended or adjusted under 35 U.S.C. 154(b) by 0 days.

(21) Appl. No.: 11/553,434

(22) Filed: Oct. 26, 2006

Related U.S. Application Data

(60) Provisional application No. 60/730,586, filed on Oct. 26, 2005.

(51) Int. Cl.
*G05F 1/575* (2006.01)
*G05F 1/618* (2006.01)

(52) U.S. Cl. ..................................... 323/282

(58) Field of Classification Search ................ 323/222, 323/224, 225, 282, 284, 286
See application file for complete search history.

(56) References Cited

U.S. PATENT DOCUMENTS

| | | | | |
|---|---|---|---|---|
| 3,623,132 A | * | 11/1971 | Green | 377/60 |
| 6,441,597 B1 | * | 8/2002 | Lethellier | 323/282 |
| 6,469,481 B1 | * | 10/2002 | Tateishi | 323/282 |
| 6,828,762 B2 | * | 12/2004 | Brkovic | 323/222 |
| 6,879,136 B1 | * | 4/2005 | Erisman et al. | 323/282 |
| 7,106,035 B2 | * | 9/2006 | Xing | 323/282 |

\* cited by examiner

*Primary Examiner*—Gary L Laxton
(74) *Attorney, Agent, or Firm*—O'Melveny & Myers LLP (57) ABSTRACT

Methods and apparatuses are provided for monitoring an inductor output current delivered to a load by a power converter. For example, there is provided an apparatus comprising: at least one power switch operatively coupled to an input voltage source; an output inductor operatively coupled to the at least one power switch and to the load; and a current sensor operatively coupled to the output inductor, the current sensor providing a current sense signal corresponding to the inductor output current delivered to the load. In one embodiment, the current sensor comprises: a filter comprising a first resistor coupled in series with a first capacitor; and a second capacitor coupled in parallel with the first resistor, the first and second capacitors forming an AC voltage divider to increase the signal-to-noise ratio of the current sense signal.

21 Claims, 7 Drawing Sheets

METHOD AND APPARATUS FOR IMPROVED CURRENT MODE CONTROL FOR LARGE CONVERSION RATIO SYNCHRONOUS BUCK CONVERTER WITH LOSSLESS CURRENT SENSE

RELATED APPLICATION DATA

This patent application claims priority pursuant to 35 U.S.C. § 119(e) to provisional patent application Ser. No. 60/730,586, filed Oct. 26, 2005.

BACKGROUND OF THE INVENTION

1. Field of the Invention

The present invention relates to switching mode power converter circuits, and more particularly, to an improved method and apparatus for monitoring the current sent to the load associated with a power converter circuit.

2. Description of Related Art

Switched mode DC-to-DC power converters are commonly used in the electronics industry to convert an available direct current (DC) level voltage to another DC level voltage. A switched mode converter provides a regulated DC output voltage by selectively storing energy by switching the flow of current into an output inductor coupled to a load. A synchronous buck converter is a particular type of switched mode converter that uses two power switches, such as MOSFET transistors, to control the flow of current in the output inductor. A high-side switch selectively couples the inductor to a positive power supply while a low-side switch selectively couples the inductor to ground. A pulse width modulation (PWM) control circuit is used to control the gating of the high-side and low-side switches in an alternating manner. Synchronous buck converters generally offer high efficiency and high power density, particularly when MOSFET devices are used due to their relatively low on-resistance.

To regulate the performance of a synchronous buck converter, it is known to monitor the amount of current sent to the load. This information is important to protect the load from damage caused by excessive current, to ensure that sufficient current is delivered to the load in view of changing load conditions (i.e., controlling voltage "droop" caused by a step load), and to permit current sharing between phases of multiphase configurations. One approach to measuring the load current is to include a sensing resistor in series with the output inductor and to monitor the voltage drop across the sensing resistor. The sensing resistor must have a resistance value large enough to keep the sensed voltage signal above the noise floor, as the voltage drop can be measured more accurately with a higher resistance value. A significant drawback of this approach is that the sensing resistor wastes the output energy and thereby reduces the efficiency of the synchronous buck converter. Moreover, the sensing resistor generates heat that must be removed from the system.

Figure 1:
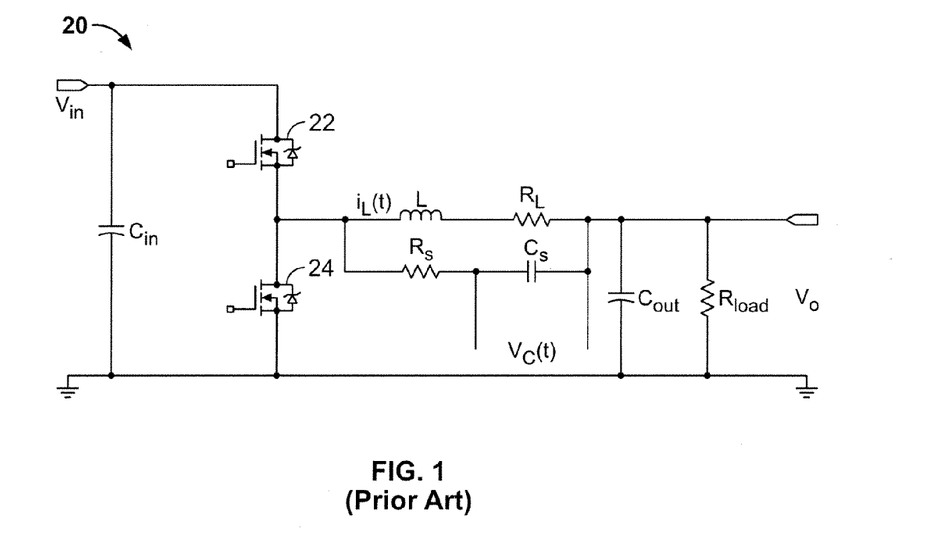
FIG. 1 is a schematic block diagram of a prior art synchronous buck converter with lossless current sensing.

To overcome this drawback, it is known to use a lossless current sense circuit in which a current sensor is coupled to the output inductor. The current sensor provides the current sense signal to the pulse width modulation circuit corresponding to current passing through an internal DC resistance of the output inductor. The current sensor further includes a resistance-capacitance (RC) filter that includes an on-state resistance of the power switch. A simplified circuit schematic of a synchronous buck converter 20 with an RC filter-based lossless current sensing scheme is shown in FIG. 1, in which: $v_C(t)$ is the voltage across the sense capacitor $C_s$; $I_L(t)$ is the current in the output inductor L; $V_{in}$ is the DC input voltage; and $V_o$ is the DC output voltage. The equivalent series resistance (ESR) of the output inductor is $R_L$. It is assumed that the MOSFETs 22 and 24 are driven complementarily with a duty ratio D and (1-D) respectively at frequency $f_s$.

The idea of lossless current sensing is to detect the inductor current $i_L$ signal by sensing capacitor voltage $v_C$. It is well known that when the matching condition $$R_s C_s = \frac{L}{R_L}$$

is satisfied, $v_C(t)$ follows $R_L i_L(t)$ exactly.

Figure 2:
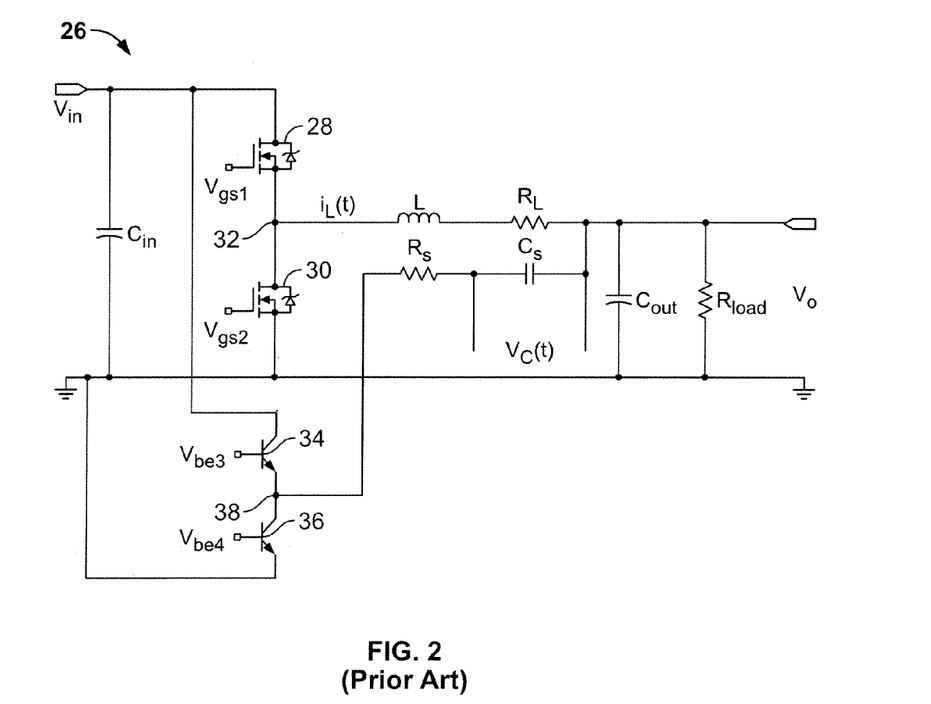
FIG. 2 is a schematic block diagram of another prior art lossless current sensing circuit for a synchronous buck converter.
Figure 3:
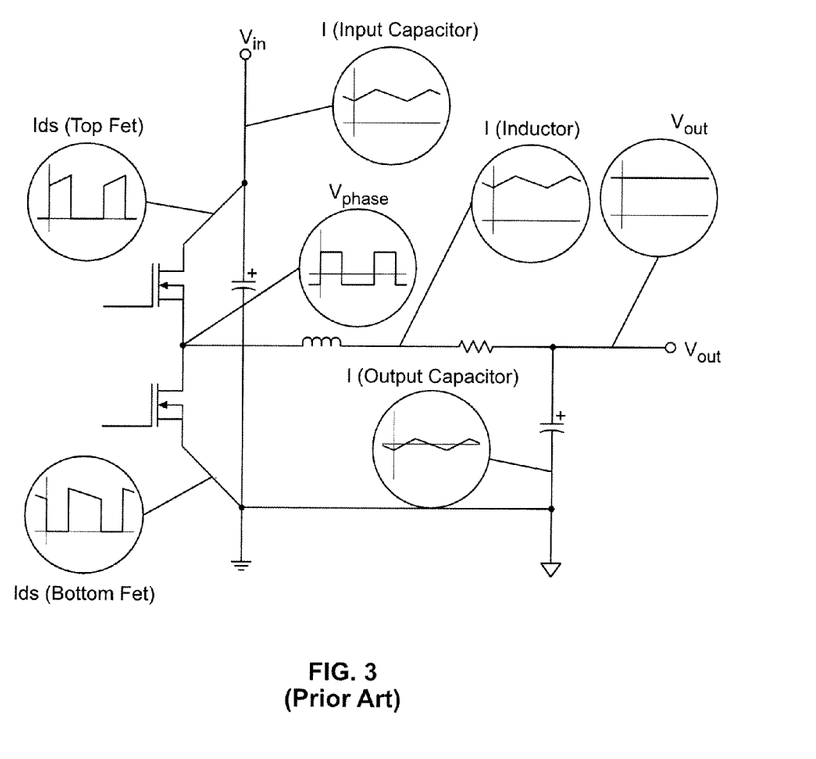
FIG. 3 is a block diagram of a prior art synchronous buck converter showing typical circuit waveforms measured at different points within the buck converter.

An improvement of the lossless current sensing scheme is disclosed in U.S. Pat. No. 6,441,597, titled "Method and Apparatus for Sensing Output Inductor Current in a DC-to-DC Power Converter," issued Aug. 27, 2002, the content of which is incorporated herein in its entirety by reference. With reference to FIG. 2, there is provided a power converter 26 comprising power switches 28 and 30. One end of the RC filter is detached from the phase node (PN) 32 and is connected to a virtual phase node (VPN) 38 generated by a small signal totem pole circuit including switches 34 and 36. The small signal totem pole is integrated in a control IC with bipolar (or CMOS) technology. Base drive signals $V_{be3}$ and $V_{be4}$ are designed to closely follow the gate drive signals of the power MOSFETs 34 and 36, respectively. Here, the $R_{ds(on)}$ of the top power MOSFET is denoted as $R_{ds1}$, and the $R_{ds(on)}$ of the bottom power MOSFET is denoted as $R_{ds2}$, so that the $R_{ds(on)}$ of the MOSFET devices is included in the resistance for current sensing. When the circuit is operated at frequency $f_s$ with switching period $T_s$ ($1/f_s$) with input voltage $V_{in}$ and output voltage $V_o$, typical circuit waveforms are shown in FIG. 3. Specifically, when the circuit parameter condition in accordance with the above equation is met, the voltage waveform across $C_s$ is the same as the inductor current waveform $i_L$ with:

$$v_{C_s}(t) = R_{eq} i_L$$

where, $R_{eq} = R_{dc}$ for the circuit in FIG. 1, $R_{eq} = DR_{ds1} + (1-D)R_{ds2} + R_L$ for the circuit in FIG. 2, and $D = V_o/V_{in}$. From the above equation, the voltage ripple on $C_s$ is:

$$\Delta v_{C_s}(t) = R_{eq} \Delta i_L$$

Figure 4:
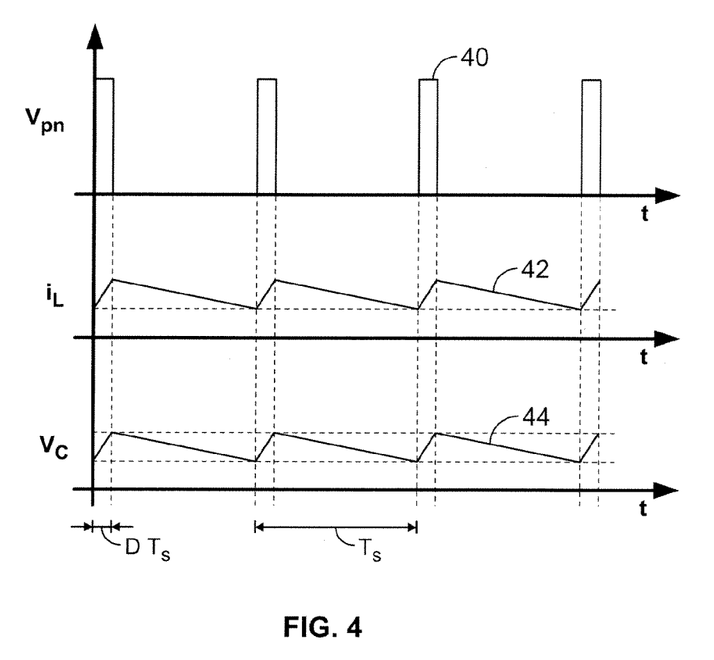
FIG. 4 are graphs showing typical circuit waveforms for a prior art synchronous buck converter with lossless current sense.

The relations expressed in the two foregoing equations are also shown in FIG. 4. Specifically, trace 40 represents $v_{pn}$, trace 42 represents $i_L$, and trace 44 represents $v_C$. Furthermore, the inductor current peak-to-peak current ripple is:

$$\Delta i_L = \frac{V_{in}}{L f_s} D(1-D)$$

and the sensed voltage peak-to-peak value is:

$$\Delta V_c = \frac{V_{in}}{L f_s} D(1-D) R_{eq}$$

Figure 5:
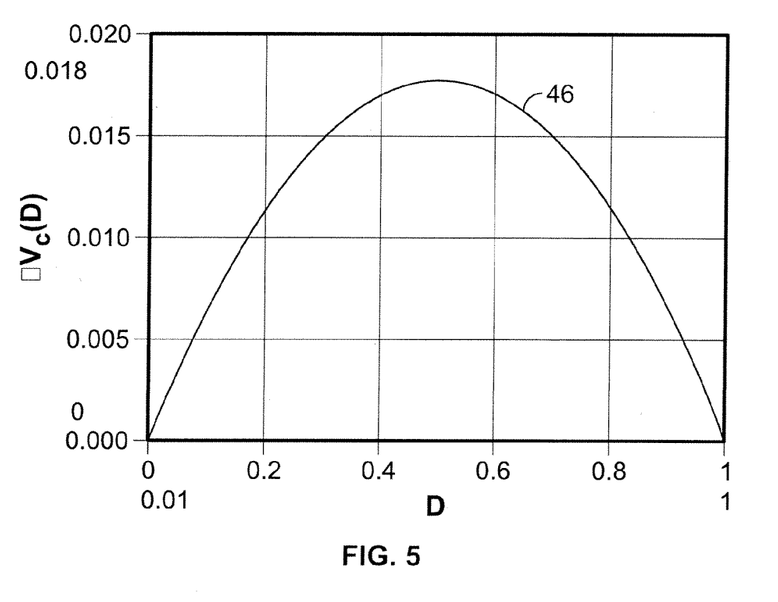
FIG. 5 is a graph illustrating sensed voltage ripple (peak-to-peak value) for a prior art synchronous buck converter with lossless current sense.

For one exemplary application, wherein $V_{in}$=12 V, $f_s$=311 kHz, L=1.8 uH, $R_L$=3.3 mOhm with inductive current sense, the relation between the sensed voltage peak-to-peak vs. the output voltage is shown in graph 46 of FIG. 5. As the duty ratio D approaches 0 or 1, the sensed voltage ripple can get very small and easily lead to pulse skipping or abnormal switching. The consequences of this include (1) increased output voltage ripple, (2) degraded EMI condition, (3) reduced circuit stability region, and (4) over stress of the power circuitry components.

Accordingly, it would be desirable to provide a way to accurately sense the output inductor current delivered to a load by a buck-type DC-to-DC switched mode power converter even when the duty ratio D approaches 0 or 1.

SUMMARY OF THE INVENTION

The present invention overcomes the shortcomings of the prior art by providing a method and apparatus for improving the signal-to-noise ratio of a current sense signal generated by the current sensor circuitry of a power converter, such as a synchronous buck converter or the like.

In accordance with one aspect of the embodiments described herein, there is provided a DC-to-DC power converter with improved monitoring of output inductor current to a load, comprising: at least one power switch connected to an input voltage source; an output inductor connected to the at least one power switch and to the load; and a current sensor circuitry coupled to the output inductor, the current sensor circuitry providing a current sense signal corresponding to current passing through an internal DC resistance of the output inductor. The current sensor circuitry includes: a filter comprising a first resistor connected in series with a first capacitor; and a second capacitor connected in parallel with the first resistor, wherein the first and second capacitors form an AC voltage divider. The second capacitor is preferably characterized by a second capacitance value that is at least one order of magnitude smaller than a first capacitance value of the first capacitor, resulting in an increased signal-to-noise ratio for the current sense signal.

In accordance with another aspect of the embodiments described herein, there is provided an apparatus for monitoring an inductor output current delivered to a load, comprising: at least one power switch operatively coupled to an input voltage source; an output inductor operatively coupled to the at least one power switch and to the load; and a current sensor operatively coupled to the output inductor, wherein the current sensor provides a current sense signal corresponding to the inductor output current delivered to the load. The current sensor includes: a filter comprising a first resistor coupled in series with a first capacitor; and a second capacitor coupled in parallel with the first resistor, the first and second capacitors forming an AC voltage divider. The second capacitor is preferably characterized by a second capacitance value that is smaller than a first capacitance value of the first capacitor, thereby increasing signal-to-noise ratio of the current sense signal. In a preferred embodiment, the second capacitance value is at least one order of magnitude smaller than the first capacitance value. The at least one power switch typically comprises a MOSFET device or the like.

In another embodiment, the apparatus further comprises at least one phase sensing switch connected to the input voltage source in parallel with the at least one power switch. In yet another embodiment, the apparatus further comprises a pulse width modulation circuit for generating common control pulses for the at least one power switch and the at least one phase sensing switch responsive to a current sense signal.

In accordance with yet another aspect of the embodiments described herein, there is provided a method for monitoring output current in a DC-to-DC power converter, wherein the power converter comprises at least one power switch, an output inductor operatively coupled to the at least one power switch, and a current sensor operatively coupled to the output inductor. The method generally comprises measuring the output current passing through the output inductor using the current sensor, wherein the current sensor includes: a filter comprising a first resistor coupled in series and a first capacitor; and a second capacitor coupled in parallel with the first resistor, the first and second capacitors forming an AC voltage divider. The method further comprises generating a current sense signal corresponding to the output current, wherein the AC voltage divider increases signal-to-noise ratio of the current sense signal for improved monitoring of the output current.

A more complete understanding of the method and apparatus for achieving improved detection of the inductor output current delivered to a load by a power converter, particularly when the duty ratio D approaches 0 or 1, will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

The present invention satisfies the need for in improved way to sense the inductor output current delivered to a load by a buck-type DC-to-DC switched mode power converter, particularly when the duty ratio D approaches 0 or 1. In the detailed description that follows, like element numerals are used to describe like elements illustrated in one or more of the drawings.

Figure 6:
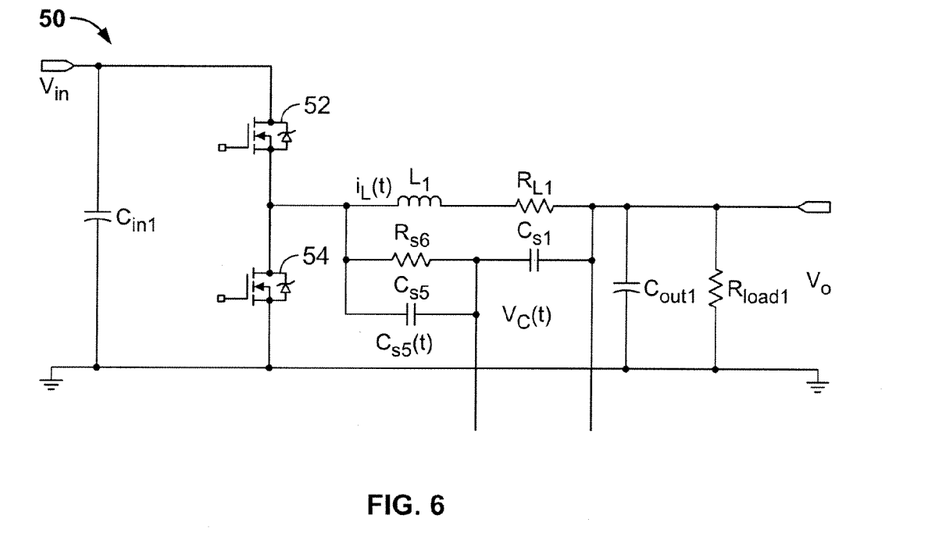
FIG. 6 is a schematic block diagram of a lossless current sense circuit for a buck converter with an added "speedy" capacitor $C_{s5}$ in accordance with an embodiment of the invention.

In accordance with one aspect of the embodiments described herein, there is provided a DC-to-DC power converter with improved sensed current signal-to-noise ratio (SNR) for reliable circuit operation under current mode control. With reference to FIG. 6, in one embodiment, the DC-to-DC power converter 50 provides an output voltage ($V_o$) to a load ($R_{load1}$), schematically represented as a resistor. The power converter further includes a high-side power switch 52 and a low-side power switch 54 connected to an input voltage source ($V_{in}$). The high-side power switch 52 and the low-side power switch 54 are generally provided by MOSFET devices, with the drain of high-side power switch 52 electrically connected to the input voltage source $V_{in}$, the source of the high-side power switch 52 electrically connected to the drain of the low-side power switch 54, and the source of the low-side power switch 54 electrically connected to ground. A power phase node is defined between the source of the high-side power switch 52 and the drain of the low-side power switch 54. An output inductor $L_1$ is connected in series between the power phase node and the load $R_{load1}$. A capacitor $C_{out1}$ is electrically connected in parallel with the load $R_{load1}$ to provide smoothing of the output voltage $V_o$.

A pulse width modulation (PWM) control circuit (not shown) can be connected to the gates of both the high-side power switch 52 and low-side power switch 54, and generates a series of pulse width modulated control pulses for the power switches 52, 54 to regulate the output voltage $V_o$ coupled to the load $R_{load1}$. The PWM control circuit provides a signal to turn on the power switches 52, 54 in an alternating manner, and can regulate the current through the output inductor $L_1$ by controlling the timing and duration of conduction of the power switches 52, 54.

The current sensing circuitry in the embodiment of FIG. 6 includes a resistance-capacitance (RC) filter that includes an on-state resistance of the power switch. It will be noted that voltage $v_C(t)$ is the voltage across the sense capacitor $C_{s1}$; $I_L(t)$ is the current in the output inductor $L_1$; $V_{in}$ is the DC input voltage; and $V_o$ is the DC output voltage. The equivalent series resistance (ESR) of the output inductor $L_1$ is $R_{L1}$. Power switches 52 and 54 are driven complementarily with a duty ratio D and (1-D) respectively at frequency $f_s$.

Figure 7:
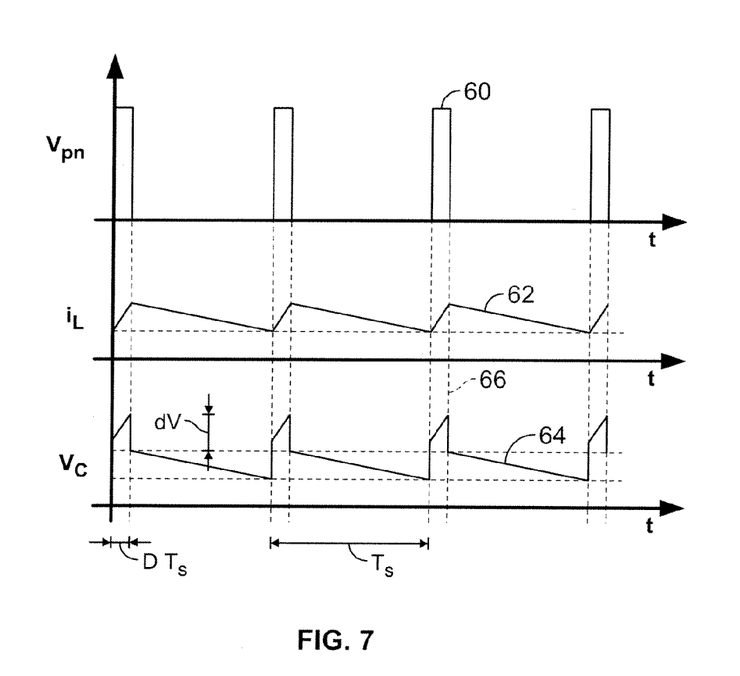
FIG. 7 is a graph illustrating a circuit waveforms for the synchronous buck converter with lossless current sense in accordance with the embodiment of FIG. 6.

The sensed current signal SNR is improved by adding a "speedy" capacitor ($C_{s5}$) to the current sensing circuitry. Specifically, capacitor $C_{s5}$ is connected in parallel with $R_{s6}$ of the RC branch formed by $R_{s6}$ and $C_{s1}$. The value of $C_{s5}$ is typically much less than that of $C_{s1}$. For example, in an exemplary embodiment, $C_{s5}$ is 22 pF, while $C_{s1}$ is 33 nF. In addition to the RC branch formed by $R_{s6}$ and $C_{s1}$, $C_{s5}$ helps by "passing" the AC component of the waveform at phase node to the current sensed signal cross $C_{s1}$. The resulting "lifted" value $\Delta V$ 66, illustrated in bottom trace ($v_C$) 64 of FIG. 7, is roughly determined by the AC voltage divider formed by $C_{s1}$ and $C_{s5}$. Typical circuit waveforms of the improved current sensing scheme are provided in FIG. 7. Specifically, trace 60 represents $v_{pn}$, trace 62 represents $i_L$, and trace 64 represents $v_C$.

Figure 8:
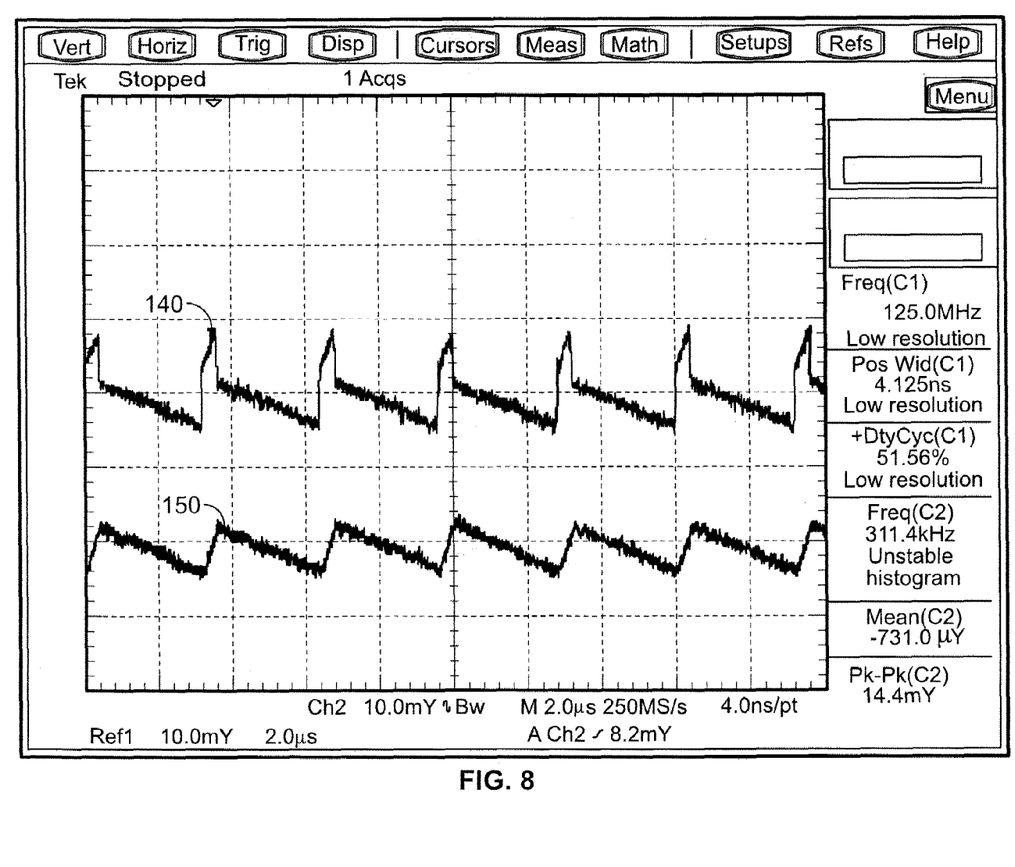
FIG. 8 is an oscilloscope view showing waveforms of $v_C$ with (top trace) and without (bottom trace) the speedy capacitor.

With reference to FIG. 8, signal 140 of the top trace represents voltage $v_C(t)$ across the sense capacitor $C_{s1}$ when "speedy" capacitor $C_{s5}$ is connected in parallel with $R_{s6}$ of the RC branch formed by $R_{s6}$ and $C_{s1}$. Signal 150 of the bottom trace represents voltage $v_C(t)$ across the sense capacitor $C_{s1}$ without capacitor $C_{s5}$. It will be noted that the current sense circuit with the "speedy" capacitor leads to a larger SNR and improves the circuit operation stability, especially at much higher or much lower power conversion voltage ratios. It will also be noted that advantages features of the present invention include but are not limited to: (1) allowing current mode control of wider DC/DC conversion with lossless current sensing; (2) providing wider stable circuit operating range without jittering; and (3) being less layout sensitive.

Figure 9:
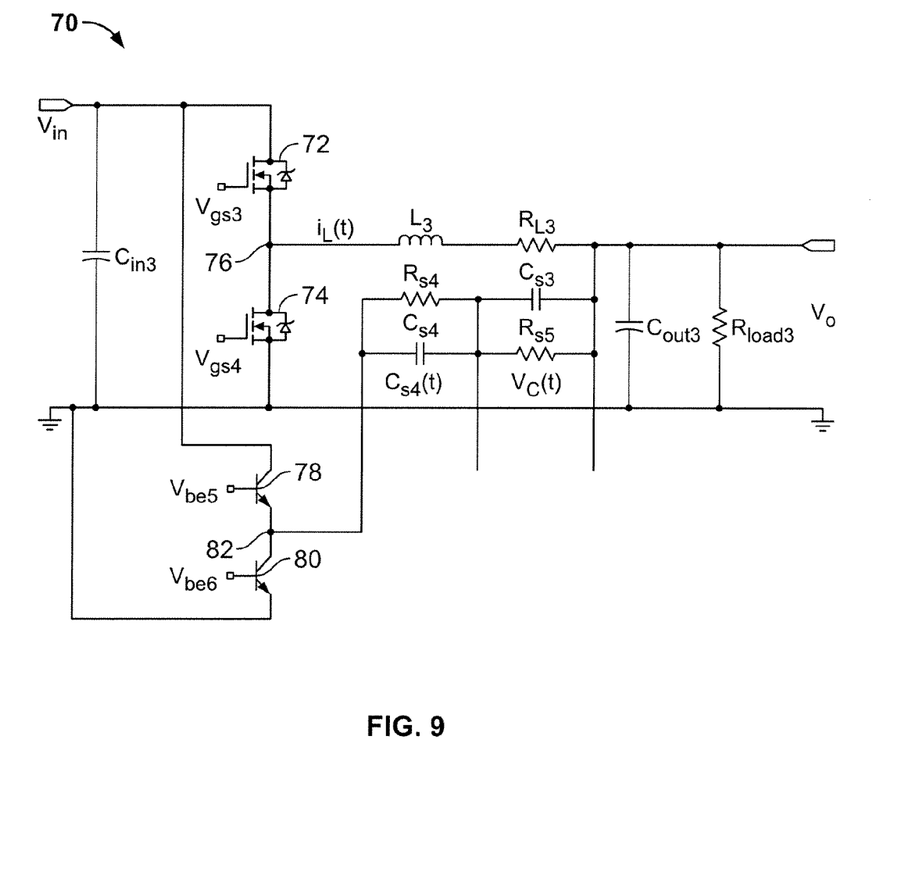
FIG. 9 is a schematic block diagram of an alternative embodiment of a buck converter with added "speedy" capacitor $C_{s4}$ to achieve higher signal-to-noise ratio.
Figure 10:
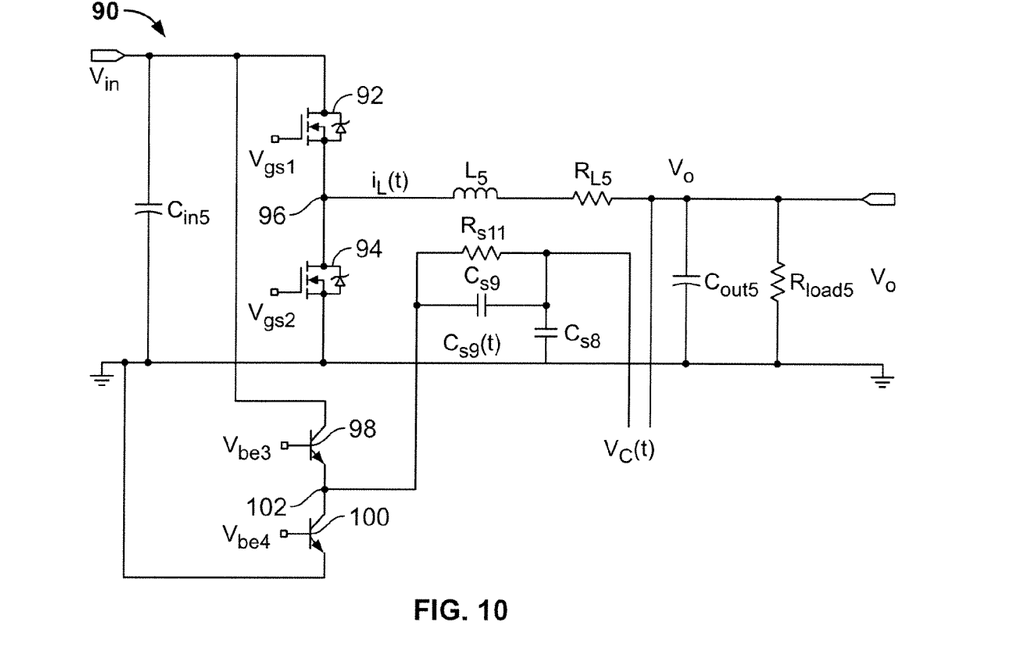
FIG. 10 is a schematic block diagram of another alternative embodiment of a buck converter with added "speedy" capacitor $C_{s9}$ to achieve higher signal-to-noise ratio.
Figure 11:
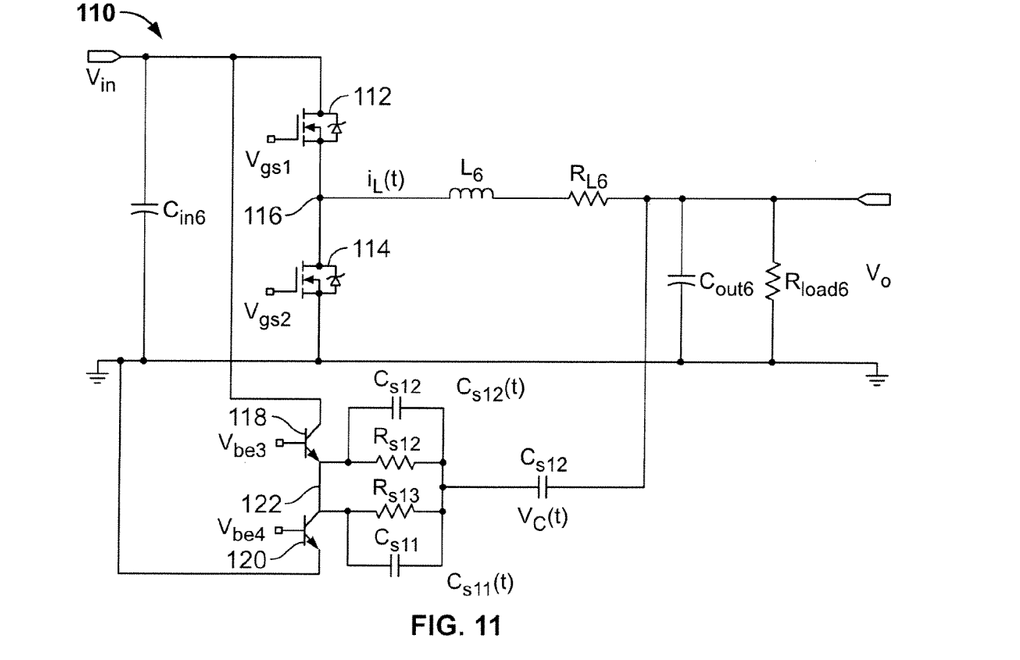
FIG. 11 is a schematic block diagram of another alternative embodiment of a buck converter with added "speedy" capacitors $C_{s11}$ and $C_{s12}$ to achieve higher signal-to-noise ratio.

FIGS. 9-11 illustrate alternative embodiments of power converters in conjunction with other current sensing schemes, wherein the RC filter is detached from the phase node (PN) and is connected to a virtual phase node (VPN) generated by a small signal totem pole circuit that includes two switches. In the exemplary embodiment of FIG. 9, there is provided a power converter 70 wherein the RC filter is connected to a VPN 82 generated by a small signal totem pole circuit that includes switches 78 and 80. The small signal totem pole can be integrated in a control IC with bipolar (or CMOS) technology. Base drive signals $V_{be5}$ and $V_{be6}$ are designed to closely follow the gate drive signals of power switches 72 and 74, respectively. The current sensing circuitry comprises "speedy" capacitor $C_{s4}$ connected in parallel with $R_{s4}$ to improve sensed current signal SNR.

In another embodiment, illustrated in FIG. 10, there is provided a power converter 90 with the RC filter connected to a VPN 102 generated by a small signal totem pole circuit that includes switches 98 and 100. Base drive signals $V_{be3}$ and $V_{be4}$ are designed to closely follow the gate drive signals of power switches 92 and 94, respectively. The sensed current signal is improved by connecting capacitor $C_{s9}$ in parallel with $R_{s11}$.

In yet another embodiment, shown in FIG. 11, there is provide a power converter 110 with the RC filter connected to a VPN 122 generated by a small signal totem pole circuit that includes switches 118 and 120. Base drive signals $V_{be3}$ and $V_{be4}$ are designed to closely follow the gate drive signals of power switches 112 and 114, respectively. The current sensing circuitry comprises "speedy" capacitor $C_{s12}$ connected in parallel with $R_{s12}$, as well as "speedy" capacitor $C_{s11}$ connected in parallel with $R_{s13}$. As a result, improved SNR in current mode control is readily obtained for higher reliability of the circuit operation.

Having thus described a preferred embodiment of a method and apparatus for improved reading of the inductor output current delivered to a load by a power converter, it should be apparent to those skilled in the art that certain advantages of the within system have been achieved. It should also be appreciated that various modifications, adaptations, and alternative embodiments thereof may be made within the scope and spirit of the present invention. For example, certain current sensor circuitry and components have been presented in the context of buck-type DC-to-DC switched mode power converters, but it should be apparent that many of the inventive concepts described above would be equally applicable for other power converters or the like.

The invention claimed is:

1. A DC-to-DC power converter with improved monitoring of output inductor current delivered to a load, comprising:
    at least one power switch connected to an input voltage source;
    an output inductor connected to the at least one power switch and to the load; and
    a current sensor circuitry coupled to the output inductor, the current sensor circuitry providing a current sense signal corresponding to current passing through an internal DC resistance of the output inductor, the current sensor circuitry comprising:
        a filter comprising a first resistor connected in series with a first capacitor; and a second capacitor connected in parallel with the first resistor, the first and second capacitors forming an AC voltage divider;

wherein the second capacitor is characterized by a second capacitance value that is at least one order of magnitude smaller than a first capacitance value of the first capacitor, thereby increasing signal-to-noise ratio of the current sense signal for improved monitoring of the output inductor current delivered to the load.

2. The DC-to-DC power converter of claim 1, further comprising at least one phase sensing switch connected to the input voltage source in parallel with the at least one power switch.

3. The DC-to-DC power converter of claim 2, further comprising a pulse width modulation circuit for generating common control pulses for the at least one power switch and the at least one phase sensing switch responsive to a current sense signal.

4. The DC-to-DC power converter of claim 3, wherein the at least one phase sensing switch and the pulse width modulation circuit are included in a common integrated circuit.

5. The DC-to-DC power converter of claim 2, wherein:
the at least one power switch comprises a high-side power switch connected to the input voltage source and a low-side power switch connected to ground; and
the high-side power switch and the low-side power switch are connected together to define a power phase node therebetween, the output inductor being connected to the power phase node.

6. The DC-to-DC power converter of claim 5, wherein:
the at least one phase sensing switch comprises a high-side phase sensing switch connected to the input voltage source and a low-side phase sensing switch connected to ground; and
the high-side phase sensing switch and the low-side phase sensing switch are connected together to define a signal phase node therebetween, the filter being connected to the signal phase node.

7. The DC-to-DC power converter of claim 6, wherein the filter further comprises:
a first on-state resistance of the high-side power switch and the high-side phase sensing switch during a first conductive state of the high-side switches; and
a second on-state resistance of the low-side power switch and the low-side phase sensing switch during a second conductive state of the low-side switches.

8. The DC-to-DC power converter of claim 1, wherein the at least one power switch comprises a MOSFET device.

9. An apparatus for monitoring an inductor output current delivered to a load, comprising:
at least one power switch operatively coupled to an input voltage source;
an output inductor operatively coupled to the at least one power switch and to the load; and
a current sensor operatively coupled to the output inductor, the current sensor providing a current sense signal corresponding to the inductor output current delivered to the load, the current sensor comprising:
a filter comprising a first resistor coupled in series with a first capacitor; and
a second capacitor coupled in parallel with the first resistor, the first and second capacitors forming an AC voltage divider;
wherein the second capacitor is characterized by a second capacitance value that is smaller than a first capacitance value of the first capacitor, thereby increasing signal-to-noise ratio of the current sense signal for improved monitoring of the output inductor current delivered to the load.

10. The apparatus of claim 9, wherein the second capacitance value is at least one order of magnitude smaller than the first capacitance value.

11. The apparatus of claim 9, further comprising at least one phase sensing switch connected to the input voltage source in parallel with the at least one power switch.

12. The apparatus of claim 11, further comprising a pulse width modulation circuit for generating common control pulses for the at least one power switch and the at least one phase sensing switch responsive to a current sense signal.

13. The apparatus of claim 12, wherein the at least one phase sensing switch and the pulse width modulation circuit are included in a common integrated circuit.

14. The apparatus of claim 11, wherein:
the at least one power switch comprises a high-side power switch connected to the input voltage source and a low-side power switch connected to ground; and
the high-side power switch and the low-side power switch are connected together to define a power phase node therebetween, the output inductor being connected to the power phase node.

15. The apparatus of claim 14, wherein:
the at least one phase sensing switch comprises a high-side phase sensing switch connected to the input voltage source and a low-side phase sensing switch connected to ground; and
the high-side phase sensing switch and the low-side phase sensing switch are connected together to define a signal phase node therebetween, the filter being connected to the signal phase node.

16. The apparatus of claim 15, wherein the filter further comprises:
a first on-state resistance of the high-side power switch and the high-side phase sensing switch during a first conductive state of the high-side switches; and
a second on-state resistance of the low-side power switch and the low-side phase sensing switch during a second conductive state of the low-side switches.

17. The apparatus of claim 9, wherein the at least one power switch comprises a MOSFET device.

18. A method for monitoring output current in a DC-to-DC power converter, the power converter comprising at least one power switch, an output inductor operatively coupled to the at least one power switch, and a current sensor operatively coupled to the output inductor, the method comprising:
(a) measuring the output current passing through the output inductor using the current sensor, the current sensor comprising:
a filter comprising a first resistor coupled in series and a first capacitor; and
a second capacitor coupled in parallel with the first resistor, the first and second capacitors forming an AC voltage divider, wherein the second capacitor is characterized by a second capacitance value that is at least one order of magnitude smaller than a first capacitance value of the first capacitor; and
(b) generating a current sense signal corresponding to the output current, wherein the AC voltage divider increases signal-to-noise ratio of the current sense signal for improved monitoring of the output current.

19. The method of claim 18, further comprising operating a pulse width modulation circuit to control the at least one power switch in response to the current sense signal.

20. The method of claim 18, wherein the step of generating a current sense signal comprises measuring a voltage differential across at least one of the first capacitor and the second capacitor.

21. The method of claim 18, further comprising filtering noise from the current sense signal when the at least one power switch changes state.

* * * * *